United States Patent [19]

Nishiyama et al.

[11] Patent Number: 5,161,101
[45] Date of Patent: Nov. 3, 1992

[54] METHOD OF FORMING AUTOMATIC MACHINE OPERATION PROGRAM

[75] Inventors: Tohru Nishiyama, Ayase; Eiji Kikuchi, Zama, both of Japan

[73] Assignee: Nissan Motor Co., Ltd., Yokohama, Japan

[21] Appl. No.: 513,706

[22] Filed: Apr. 25, 1990

[30] Foreign Application Priority Data

Apr. 28, 1989 [JP] Japan .................................. 1-107793
Apr. 28, 1989 [JP] Japan .................................. 1-107794

[51] Int. Cl.⁵ ...................... G06F 15/46; G05B 19/42
[52] U.S. Cl. ...................................... 364/191; 395/88; 901/3
[58] Field of Search ................... 364/167.01, 188, 191, 364/192, 193; 395/85, 88; 318/568.11, 568.13; 901/1-7

[56] References Cited

U.S. PATENT DOCUMENTS

| | | | |
|---|---|---|---|
| 4,670,849 | 6/1987 | Okada et al. | 395/88 |
| 4,831,549 | 5/1989 | Red et al. | 364/513 |
| 4,981,252 | 1/1991 | Yazaki et al. | 228/102 |
| 4,998,050 | 3/1991 | Nishiyama et al. | 364/191 |
| 5,005,277 | 4/1991 | Uemura et al. | 28/407 |

FOREIGN PATENT DOCUMENTS

3714028 11/1988 Fed. Rep. of Germany .
1153387 6/1989 Japan .
23584 1/1990 Japan .
8503368 8/1985 PCT Int'l Appl. .

OTHER PUBLICATIONS

German Patent Office Action, dated Mar. 8, 1991, citing two references (enclosed herewith), pp. 1-4 and translation thereof.
Article on "Maschine Und Werkzeug", (4 pages) and translation of pertinent portions thereof.

*Primary Examiner*—Jerry Smith
*Assistant Examiner*—Thomas E. Brown
*Attorney, Agent, or Firm*—Pennie & Edmonds

[57] ABSTRACT

A method of forming operation programs used in operating respective automatic machines having the same specifications and individual variations. The method employs normal position data specifying predetermined normal positions at which the respective automatic machines are to operate and operation pattern data specifying a predetermined pattern of operation of the automatic machines. Actual normal positions at which the respective automatic machines operate actually are measured to form individual variation data specifying deviations of the measured actual normal positions from the respective predetermined normal positions. The normal position data are corrected based on the individual variation data. The corrected normal position data are combined with the operation pattern data to form operation programs required for controlling the respective automatic machines.

8 Claims, 5 Drawing Sheets

METHOD OF FORMING AUTOMATIC MACHINE OPERATION PROGRAM

BACKGROUND OF THE INVENTION

This invention relates to a method of forming operation programs used in operating respective automatic machines having the same specifications.

For example, Japanese Patent Application Nos. 62-313023 and 63-143479, filed by the applicants of the present invention, discloses vehicle body assembling units. When such automatic machines are installed respectively in separate factories, a common operation program cannot be used to operate them in a most efficient manner due to individual variations including variations resulting from changes with time and installation condition differences from one factory to another although the automatic machines have the same design specifications. For this reason, it is the conventional practice to form and accomplish operation programs separately for the respective automatic machines. However, this requires time consuming operations to make a perfect operation program for each of the automatic machines. This is true particularly when the automatic machine operates for various kinds of work. In addition, it is very difficult, if not impossible, to incorporate convenient alternatives found in one factory into the operation programs used in the other factories.

SUMMARY OF THE INVENTION

Therefore, it is a main object of the invention to provide an improved operation program forming method which can form accomplished operation programs used in operating respective automatic machines of the same design specifications easily and in a shorter time.

There is provided, in accordance with the invention, a method of forming operation programs used in operating respective automatic machines for a plurality of kinds of work. The automatic machines have the same specifications and individual variations. The method comprises the steps of providing normal position data specifying predetermined normal positions at which the respective automatic machines are to operate for each of the kinds of work, providing operation pattern data specifying a predetermined pattern of operation of the automatic machines for each of the kinds of work, measuring actual normal positions at which the respective automatic machines operate actually for each of the kinds of work, providing individual variation data specifying deviations of the measured actual normal positions from the respective predetermined normal positions for each of the kinds of work, selecting one of the automatic machines, selecting one of the kinds of work, correcting the predetermined normal position data related to the selected automatic machine and the selected kind of work based on the individual variation data related to the selected automatic machine and the selected kind of work, combining the corrected normal position data with the operation pattern data related to the selected automatic machine and the selected kind of work to form an operation program required for the selected automatic machine to operate for the selected kind of work, repeating the above sequence of steps to form operation programs required for the selected automatic machine to operate for the other kinds of work, and repeating the above sequence of steps to form operation programs required for the other automatic machines for all of the kinds of work.

In another aspect of the invention, there is provided a method of forming operation programs used in operating respective automatic machines for a plurality of kinds of work. The automatic machines have the same specifications and individual variations. The method comprises the steps of providing normal position data specifying predetermined normal positions at which the respective automatic machines are to operate for each of the kinds of work, providing operation pattern data specifying a predetermined pattern of operation of the automatic machines for each of the kinds of work, measuring actual normal positions at which the respective automatic machines operate actually for each of the kinds of work, providing individual variation data specifying deviations of the measured actual normal positions from the respective predetermined normal positions for each of the kinds of work, selecting one of the automatic machines, selecting one of the kinds of work, combining the normal position data related to the selected automatic machine and the selected kind of work with the operation pattern data related to the selected automatic machine and the selected kind of work to form a basic operation program required for the selected automatic machine to operate for the selected kind of work, correcting the basic operation program work based on the individual variation data related to the selected automatic machine and the selected kind of work, repeating the above sequence of steps to form operation programs required for the selected automatic machine to operate for the other kinds of work, and repeating the above sequence of steps to form operation programs required for the other automatic machines for all of the kinds of work.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
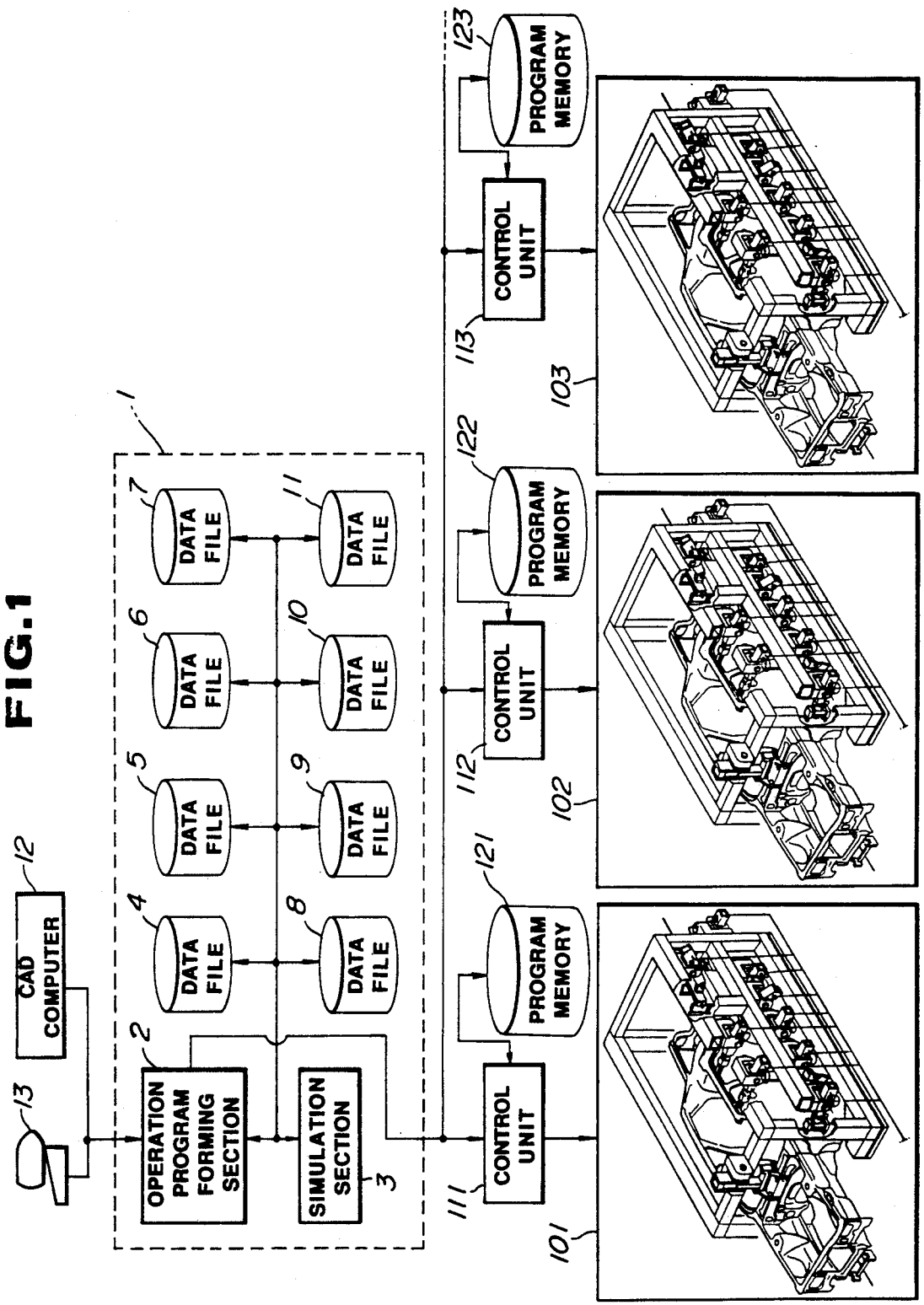
FIG. 1 is a schematic block diagram of an automatic machine operation program forming system embodying the method of the invention.

With reference to the drawings, where like numerals refer to like parts in the several views, and in particular to FIG. 1, there is a schematic diagram of an automatic machine operation program forming system embodying the method of the invention. Although this invention will be described in connection with vehicle body assembling units, it should be understood that the principles and approaches of the invention are applicable to other automatic machines as well.

The program forming system includes a main computer 1 for forming a plurality of operation programs used in operating the respective vehicle body assembling units 101, 102, and 103. It is, of course, understood that additional assembly units may be included in accordance with the present invention. The aforementioned assembly units are in tack welding stations of separate automotive vehicle production lines arranged for production of automotive vehicles. Each of the assembling units employs a number of manipulator arms (robot) to position vehicle body component panels (works) and to join the positioned vehicle body component panels by spot welding to assemble a vehicle body. These assembling units 101, 102, and 103 are designed to have the same specifications (for example, the same number of manipulator arms).

The main computer 1 is shown functionally as including an operation program forming section 2, a simulation section 3 and various data files 4–11. However, the main computer 1 should also be regarded as including a central processing unit (CPU), a random access memory (RAM), a read only memory (ROM) and an input-/output control unit. The central processing unit communicates with the rest of the computer via a data bus. The read only memory contains the program for operating the central processing unit. The main computer 1 communicates with a computer aided design (CAD) computer 12 and with a terminal unit 13 having a key board and a display unit. The main computer 1 also communicates with control units 111, 112, and 113 through which the formed operation programs are transferred from the main computer 1 to the operation program memories 121, 122, and 123 associated with the respective control units 111, 112, and 113. It is of course understood that the number of control units and corresponding memories may be increased in accordance with any desired increase in the number of vehicle body assembly units. The control units 111, 112, and 113 operate the respective vehicle body assembling units 101, 102, and 103 according to the operation programs stored in the respective operation program memories 121, 122, and 123.

The first data file 4 stores normal position data prepared based on the computer aided design (CAD) data obtained for each of the vehicle types of each of the vehicle kinds (sedan, coupe, etc.) The normal position data are transferred from the CAD computer 12 into the first data file 4. The normal position data specify predetermined normal positions of the respective reference points to which the respective work tools (positioning gauges and welding guns) should be carried to position the vehicle body panels and join the positioned vehicle body panels by spot welding, as shown in Table 1. These predetermined normal positions are expressed in a three-dimensional orthogonal coordinate system (x, y, z).

The second data file 5 stores assembling unit data prepared for each of the vehicle body assembling units. The assembling unit table data are transferred into the second data file 5 from the terminal unit 13. The assembling unit table data specify the factory, the production line and the work station in which a vehicle body assembling unit is installed, and the code of communication of the vehicle body assembling unit with the main computer 1, as shown in Table 2. Accordingly, the communication code for a desired vehicle body assembling unit can be specified if the factory, the line and the work station for the desired vehicle body assembling unit are specified.

The third data file 6 stores vehicle structure data obtained empirically for each of the vehicle types of each of the vehicle kinds. As shown in Table 3, the vehicle structure data include approach position data and accomplished data. The approach position data specify approach positions at which the respective work tools (positioning gauge and welding guns) should be stopped just before they are carried to the corresponding normal positions. The accomplished data specify correction factors by which the corresponding normal positions should be corrected to provide an improved operation accuracy of the vehicle body assembling units. The correction factors are dependent on the structure and rigidity of the vehicle body component panels transferred into the tack welding station. Each of the approach positions is given in the form of distances in the x-, y- and z-directions from the corresponding normal position. Each of the correction factors is given in the form of distances in the x-, y- and z-directions from the corresponding normal position. The approach positions are defined as positions to which the respective work tools can move without interference with the vehicle body panels when the vehicle body structure having vehicle body components, which are different in shape and dimension from one vehicle type to another and from one vehicle kind to another, was designed. The correction factors are defined as amounts by which the respective normal positions should be changed to accommodate differences in the structure and rigidity of the vehicle body components which are different from one vehicle kind to another and from one vehicle type to another for the same vehicle kind so as to increase the vehicle body assembling accuracy. The correction factors are determined during the development of the vehicle body assembling units of the same specifications or during the operation of the vehicle body assembling units installed in the respective tack welding stations.

The fourth data file 7 stores individual variation data specifying first position errors and second position errors, as shown in Table 4. The first position errors indicate deviations of the actual positions of the respective manipulator arm axes from the corresponding positions specified by the operation program formed for each of the vehicle body assembling units when the manipulator arms axes are at the origin on the operation program. The second position errors indicate deviations of the actual positions of the respective manipulator arm axes from the corresponding positions specified by the operation program formed for each of the vehicle body assembling units when the manipulator arms axes are moved independently to each of predetermined check points. The first and second position errors are measured when the corresponding vehicle body assembling unit is installed and at uniform intervals of time to compensate for variations with time. Accordingly, the individual variation data indicate deviations of the actual work tool positions from the corresponding predetermined normal positions for each of the vehicle types of each of the vehicle kinds. The actual work tool positions are measured when the corresponding vehicle body assembling unit is installed and at uniform intervals of time to compensate for variations with time. The first and second position errors are expressed in the three-dimensional standard coordinate system (x, y, x).

The fifth data file 8 stores operation pattern data prepared for each of the manipulator arms (robots) and for each of the vehicle types of each of the vehicle kinds. The operation pattern data are transferred into the fifth data file 8 from the terminal unit 13. The operation pattern data specify the x-, y- and z-direction displacements of each of the manipulator arms made at each of steps 1, 2, 3, 4, ..., as shown in Table 5. The operation pattern data form a basic program used for moving the corresponding manipulator arms. The manipulator arm can carry the work tool(s) from the origin to the reference point(s) where panel positioning and/or spot welding are effected and hence to the origin in the most efficient manner without interference with the vehicle body panels if the steps are executed in a predetermined order.

The seventh data file 10 stores control data transferred thereinto from the terminal unit 13. The control data specify an operation speed at which a manipulator arm is operated and a maximum speed that indicates an upper limit speed permitted for the manipulator arm, as shown in Table 6. The maximum speed is measured when the vehicle body assembling unit is installed in the corresponding work station and the operation speed is set at a value sufficiently less than the maximum speed.

TABLE 1

| KIND ROBOT NO. | S GAUGE NO. OR WELDING GUN NO. | TYPE SEDAN POSITION | | |
|---|---|---|---|---|
| | | x | y | z |
| 1 | 1 | 2.3 | 23.0 | 5.0 |
| | 2 | 2.3 | 23.0 | 5.0 |
| 2 | 1 | 4.5 | 3.0 | 3.5 |
| | 2 | 5.0 | 3.5 | 4.0 |
| | 3 | 5.5 | 3.6 | 3.8 |
| 3 | 1 | 4.3 | 10.0 | 9.5 |
| | 2 | 4.8 | 11.5 | 10.0 |
| ... | ... | ... | ... | ... |
| | | | (× 100 mm) | |

TABLE 2

| FACTORY CODE | LINE CODE | STATION CODE | COMMUNICATIO CODE |
|---|---|---|---|
| M | B/M | #30 | 101 |
| U | B/M | #20 | 102 |
| ... | ... | ... | ... |

TABLE 3

| | KIND: S | TYPE: 4-DOOR SEDAN | |
|---|---|---|---|
| ROBOT NO. | GAUGE NO. OR WELDING GUN NO. | CORRECTION FACTOR | APPROACH POSITION |
| 1 | 1 | 2.0, 0.2, 3.0 | 1.2, 2.0, 3.3 |
| | 2 | 1.0, 1.0, 1.0 | 4.2, 3.0, 2.1 |
| ... | ... | ... | ... |

TABLE 4

| FACTORY CODE | LINE U CODE | STATION B/N CODE | ROBOT #20 NO. 4 | | |
|---|---|---|---|---|---|
| AXIS NO. | AXIS DIR. | FIRST POSITION ERRORS AT ORIGIN | CHECK POINT NUM. | SECOND POSITION ERRORS AT CHECK POINTS | |
| | | | | P1 ... | pn |
| 1 | x | 22 | 2 | 0.12 −0.72 | 0.56 |
| 2 | y | 37 | 2 | 0.54 −0.53 | 0.62 |
| 3 | z | 5 | 3 | −0.12 −0.6 | −0.10 |
| 4 | 0x | 11 | 2 | 0.00 0.70 | 0.02 |
| 5 | 0y | 2 | 2 | 0.25 0.42 | 0.25 |
| 6 | 0Z | 12 | 3 | 0.75 0.82 | 0.03 |

TABLE 5

| VEHICLE TYPE | | SEDAN |
|---|---|---|
| ROBOT NO | | 1 |
| STEP NO. | DISPLACEMENT | POSITION |
| 1 | X: 0.0<br>y: 0.0<br>z: 0.0 | ORIGIN |
| 2 | x: 17.5<br>y: 91.5<br>z: 61.2 | APPROACH POSITION |
| 3 | X: 15.5<br>Y: 0.0<br>Z: 0.0 | APPROACH POSITION |
| 4 | x: 0.0<br>y: 0.0<br>z: 0.0 | NORMAL POSITION |
| ... | ... | ... |

TABLE 6

| FACTORY CODE M ROBOT NO. | LINE CODE B/M MAXIMUM SPEED | STATION CODE #30 OPERATION SPEED |
|---|---|---|
| 1 | 500 | 200 |
| 2 | 500 | 200 |
| 3 | 650 | 300 |
| ... | ... | ... |

TABLE 7

| | PROGRAM NO. | | 2 | | |
|---|---|---|---|---|---|
| | VEHICLE KIND | | S | | |
| | VEHICLE TYPE | | COUPE | | |
| | ROBOT NO. | | 3 | | |
| STEP NO. | OPERATION SPEED | 1ST AXIS | 2ND AXIS | ... | nTH AXIS |
| 1 | 100 | 1.2 | −7.4 | ... | 4.2 |
| 2 | 100 | 2.5 | 1.7 | ... | 6.2 |
| 3 | 200 | 2.7 | 4.5 | ... | −1.2 |
| ... | ... | ... | ... | ... | ... |
| m | 200 | 1.8 | 2.5 | ... | 3.0 |

The sixth data file 9 stores robot shape CAD data prepared for each of the vehicle body assembling units and transferred thereinto from the terminal unit 13. The robot shape CAD data specify the shape, dimension and arrangement of each of the manipulator arms including the work tools. The eighth data file 11 stores vehicle body shape CAD data including numeral data indicating the shape and dimension of each of the vehicle body components for each of the vehicle types of each of the vehicle kinds. The CAD data are formed by the CAD computer 12 when the assembling unit was designed and transferred into the eighth data file 11.

Figure 2:
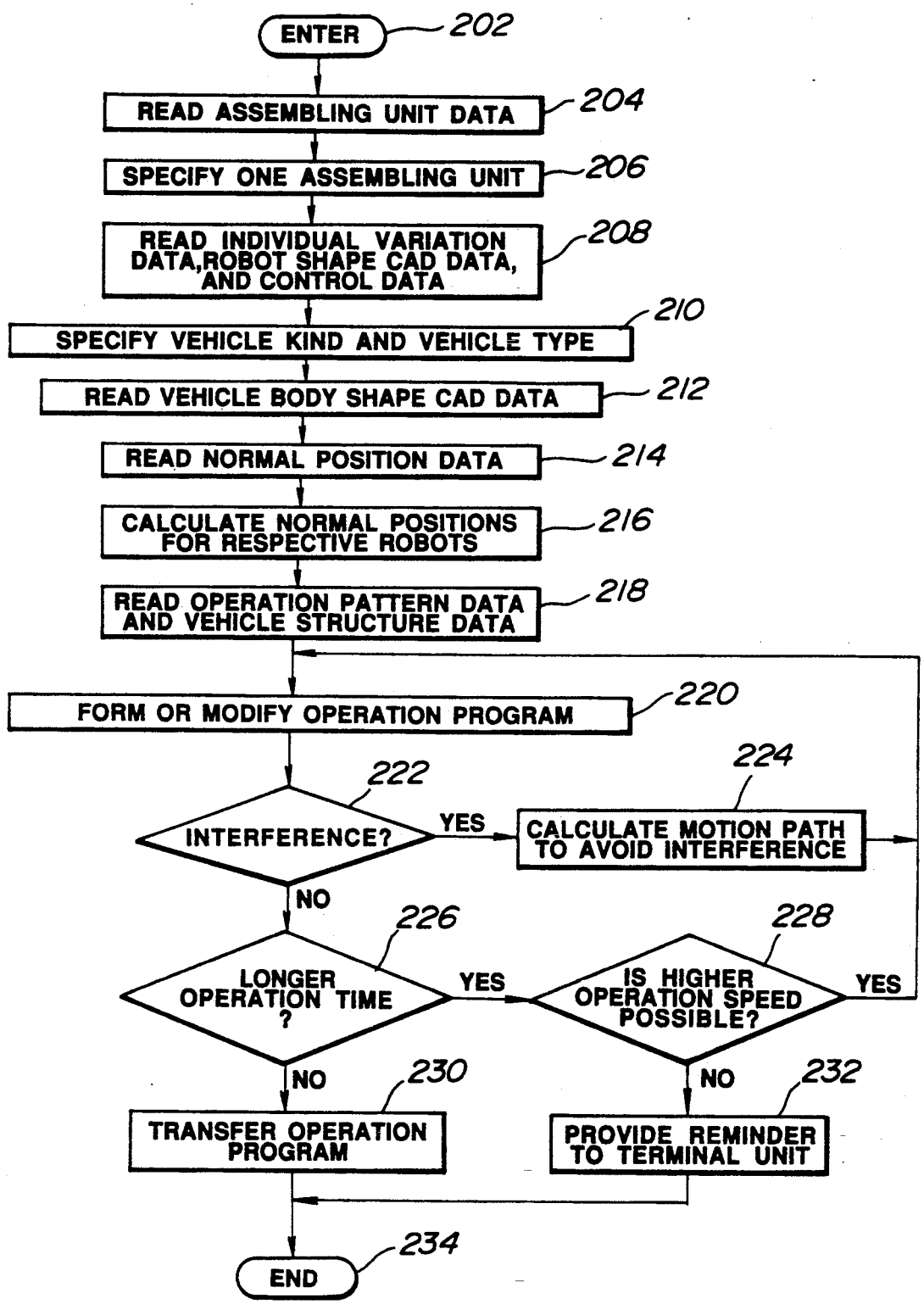
FIG. 2 is a flow diagram illustrating the programming of the main computer as it is used to form operation programs.

FIG. 2 is a flow diagram illustrating the programming of the main computer 1. The computer program is entered at the point 202. At the point 204 in the program, the main computer 1 reads the assembling unit data from the second data file 5. At the point 206 in the program, one of the vehicle body assembling units listed on the assembling unit data is specified. It is now assumed that the vehicle body assembling unit 101 is specified at the point 206. At the point 208 in the program, the main computer 1 reads the individual variation data related to the specified vehicle body assembling unit 101 from the fourth data file 7, the robot shape CAD data related to the specified vehicle body assembling unit 101 from the sixth data file 9, and the control data related to the specified vehicle body assembling unit 101 from the seventh data file 10. The read data indicate the characteristics of the specified vehicle body assembling unit 101.

At the point 210 in the program, the main computer 1 specifies one of the vehicle kinds and one of the vehicle types of the specified vehicle kind. At the point 212 in the program, the main computer 1 reads the vehicle body shape CAD data related to the specified vehicle type of the specified vehicle kind from the eighth data file 11. At the step 214 in the program, the main computer 1 reads the normal position data related to the specified vehicle type of the specified vehicle kind from the data file 4. Since the read normal position data are expressed in a three-dimensional orthagonal coordinate system located on a vehicle body, the main computer 1 converts the read normal position data into corresponding normal positions expressed in a three-dimensional orthagonal coordinate system located on the specified vehicle body assembling unit and modifies the converted normal positions based on the individual variation data read previously from the fourth data file 7 to calculates normal positions for the respective manipulator arms (robots). Since the individual variation data include position errors related only to the origin and the check points, the main computer 1 is programmed to interpolate between the data so as to obtain the position errors for the other points. At the step 218 in the program, the main computer 1 reads the operation pattern data related to the specified vehicle type of the specified vehicle kind from the fifth data file 8 and the vehicle structure data related to the specified vehicle type of the specified vehicle kind from the third data file 6.

At the step 220 in the program, the main computer 1 modifies the normal positions calculated at the point 216 based on the accomplished data included in the vehicle structure data and calculates approach positions based on the modified normal positions. The main computer 1 writes the modified normal positions and the calculated approach positions onto the operation pattern data and adds the operation speeds read from the control data to form an operation program for controlling each of the manipulator arms (robots) used in the specified vehicle body assembling unit 101 for assembling vehicle bodies of the specified vehicle type of the specified vehicle kind, as shown in Table 7. Since the accomplished data, which are obtained during the development of the specified vehicle body assembling unit and during the operation of the specified vehicle body assembling unit, are incorporated into the operation program, it is possible to operate the specified vehicle body assembling unit with a higher vehicle body assembling accuracy.

At the point 222 in the program, a determination is made as to whether or not at least one manipulator arm interferes with one of the other manipulator arms and-/or the vehicle body panels. For this determination, simulations are made to detect at least one point occupied by a plurality of objects (manipulator arms and vehicle body panels) while moving the manipulator arms intermittently at uniform intervals of time based on the operation program formed at the point 220. The simulations employ three-dimensional models of the respective manipulator arms obtained from the robot shape CAD data related to the specified vehicle body assembling unit and three-dimensional models of the respective vehicle body components obtained from the vehicle body shape CAD data related to the specified vehicle type of the specified vehicle kind. If the anser to this question is "yes", then the program proceeds to the point 224. Otherwise, the program proceeds to the point 226.

At the point 224 in the program, the main computer 1 calculates the path of movement of each of the manipulator arms to avoid the interference. Following this, the program returns to the point 220 where the operation program is modified to define the calculated path.

At the point 226 in the program, a determination is made as to whether or not the operation interval between the time at which the manipulator arm operation starts and the time at which the manipulator arm operation is completed is longer than a predetermined task time. The operation interval is measured during the simulations made at the point 222. If the answer to this question is "yes", then the program proceeds to the point 228. Otherwise, the program proceeds to the point 230.

At the point 228 in the program, a determination is made as to whether or not the manipulator arm related to the operation delay can move at a higher operation speed; that is, the operation speed of the manipulator arm is less than its maximum speed. If the answer to this question is "yes", then the program returns to the point 220 where the operation program is modified to change the operation time to a greater value that is less than the maximum speed. Otherwise, the program proceeds to the point 232 where a reminder is provided to the terminal unit 13 that the task time should be changed, the manipulator arm should be replaced, or another manipulator arm should be added. Following this, the program proceeds to the end point 234.

At the point 230 in the program, the main computer 1 reads the communication code related to the specified vehicle body assembling unit 101 from the assembling unit table data and transfers the operation program to the control unit 111 associated with the specified vehicle body assembling unit 101. Following this, the program proceeds to the end point 234.

This program is executed repetitively for the other vehicle types of the specified vehicle kind and for all of the vehicle types of the other vehicle vehicle body assembling unit 101. Similar operations are made to form operation programs for the other body assembling units.

Figure 3:
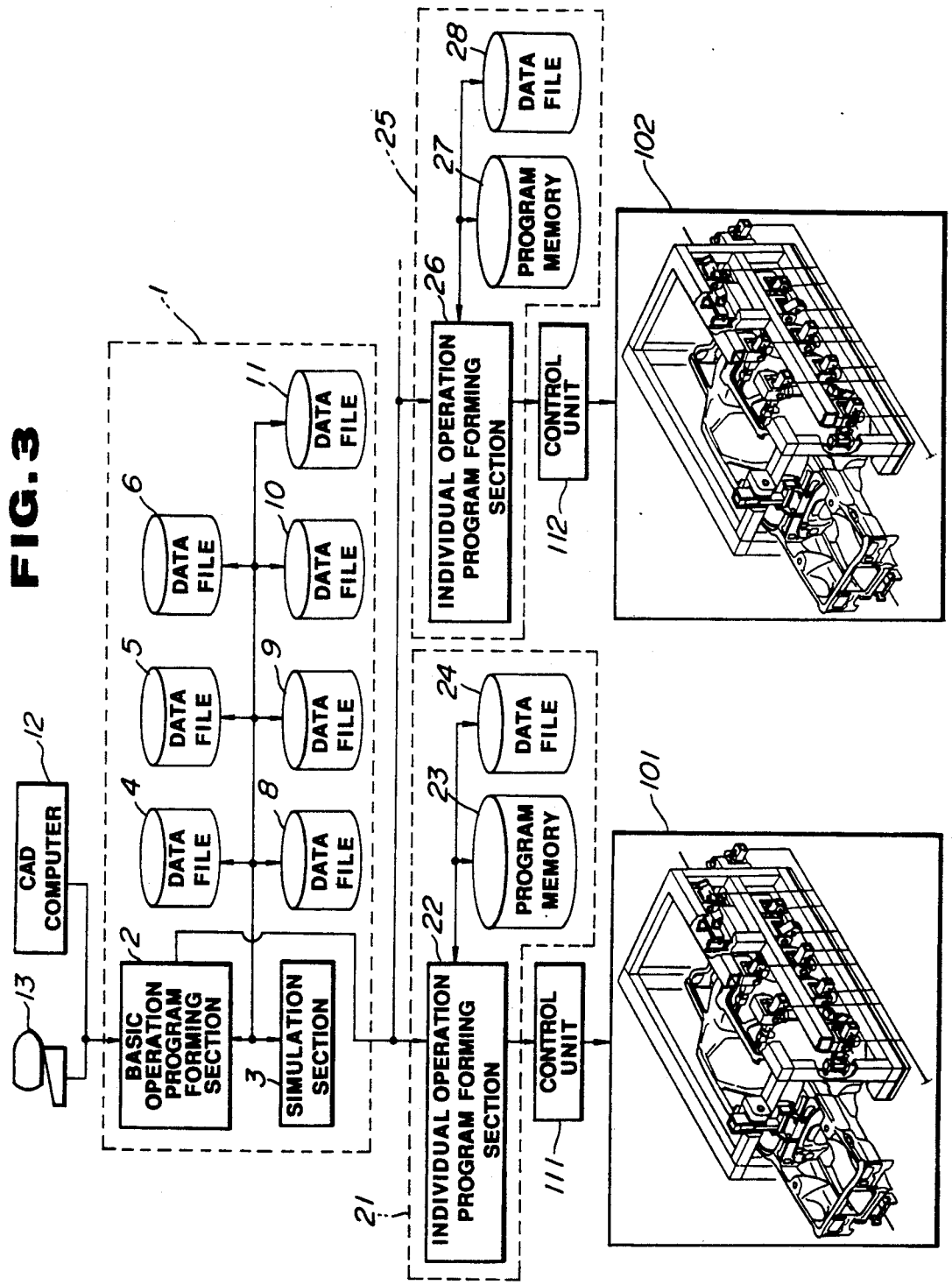
FIG. 3 is a schematic block diagram showing another embodiment of the invention.

Referring to FIG. 3, there is illustrated a second embodiment of the automatic machine operation program forming system of the invention. Like reference numerals have been applied to FIG. 3 with respect to the equivalent components shown in FIG. 1.

In this embodiment, the program forming system includes a main computer 1 for forming a basic operation program for each of the vehicle types of each of the vehicle kind. The basic operation program is transferred to sub computers 21, 25, etc. which convert the transferred basic operation program into individual operation programs used in operating respective vehicle body assembling units 101, 102, etc. installed in tack welding stations of separate automotive vehicle production lines arranged for multikind production of automotive vehicles. Each of the assembling units employs a number of manipulator arms (robot) to position vehicle body component panels (works) and jointing the positioned vehicle body component panels by spot welding to assemble a vehicle body. These assembling units 101, 102, etc. are designed to have the same specifications (for example, the same number of manipulator arms).

The main computer 1 is shown functionally as including an operation program forming section 2, a simulation section 3 and various data files 4-6 and 8-11. However, the main computer 1 should also be regarded as including a central processing unit (CPU), a random access memory (RAM), a read only memory (ROM) and an input/output control unit. The central processing unit communicates with the rest of the computer via data bus. The read only memory contains the program for operating the central processing unit. The main computer 1 communicates with a computer aided design (CAD) computer 12 and also with a terminal unit 13 having a key board and a display unit. The data file 4 stores normal position data as shown in Table 1. The data file 5 stores assembling unit data as shown in Table 2. The data file 6 stores vehicle structure data as shown in Table 3. The data file 8 stores operation pattern data as shown in Table 5. The data file 9 stores robot shape CAD data as described in connection with the first embodiment. The data file 10 stores control data as shown in Table 6. The data file 11 stores vehicle body shape CAD data as described in connection with the first embodiment.

The sub computers 21, 25, etc. are substantially the same in structure and function. Although each of the sub computers is shown functionally as including an individual operation program forming section 22 (26), an operation program memory 23 (28), and an individual variation data file 24 (28), each should be regarded as including a central processing unit (CPU), a random access memory (RAM), a read only memory (ROM) and an input/output control unit. The central processing unit communicates with the rest of the sub computer via data bus. The read only memory contains the program for operating the central processing unit. The sub computers 21, 22, etc. communicate with control units 111, 112, etc. for operating the respective vehicle body assembling units 101, 102 etc. according to the individual operation programs formed in the respective sub computers 21, 25, etc. The data files 24, 28, etc. stores individual variation data, as shown in Table 4, obtained empirically for the respective vehicle body assembling units 101, 102, etc.

Figure 4:
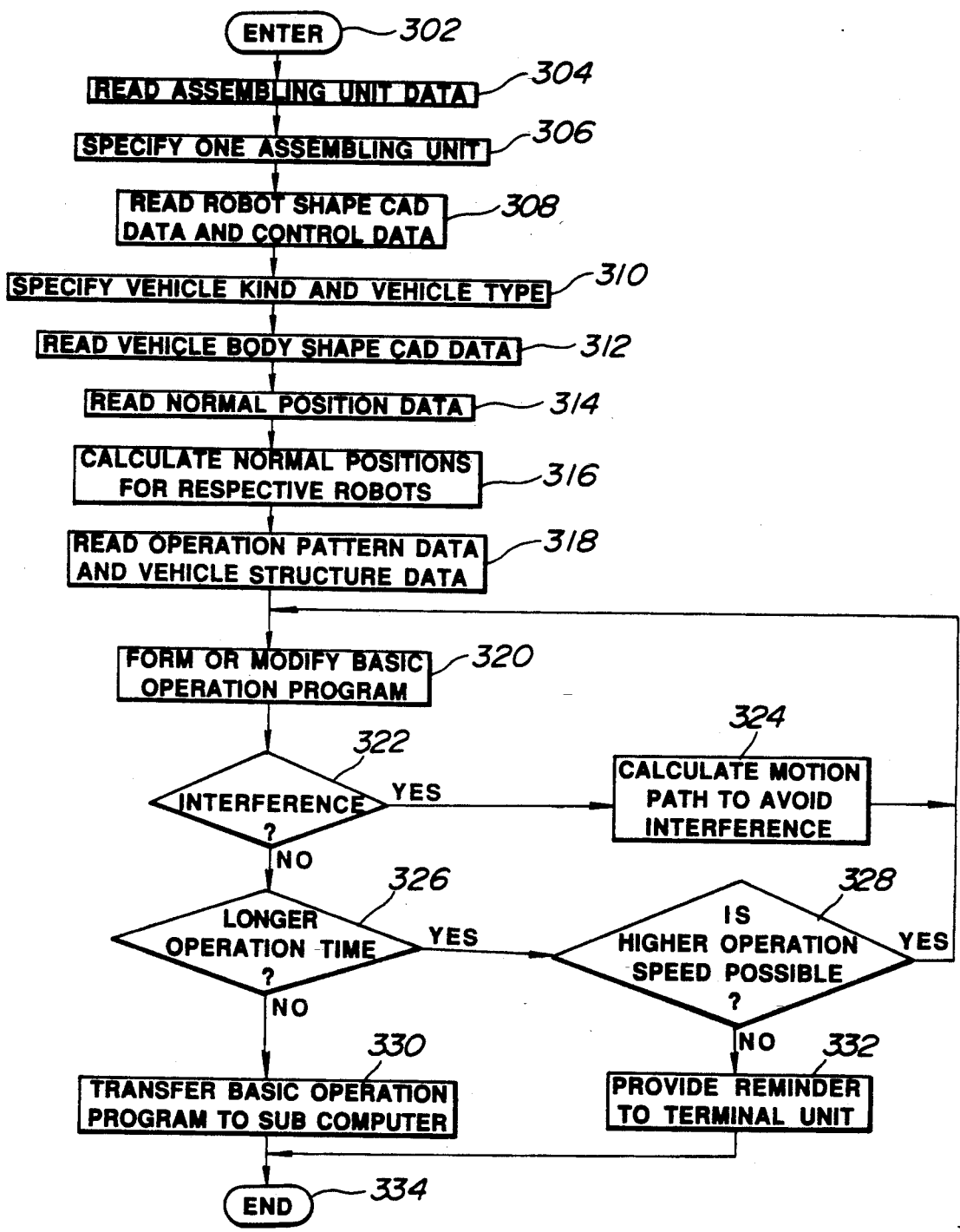
FIG. 4 is a flow diagram illustrating the programming of the main computer as it is used to form a basic operation program.

FIG. 4 is a flow diagram illustrating the programming of the main computer 1 as it is used to form a basic operation program. The computer program is entered at the point 302. At the point 304 in the program, the main computer 1 reads the assembling unit data from the second data file 5. At the point 306 in the program, one of the vehicle body assembling units listed on the assembling unit data is specified. It is now assumed that the vehicle body assembling unit 101 is specified at the point 306. At the point 308 in the program, the main computer 1 reads the robot shape CAD data related to the specified vehicle body assembling unit 101 from the sixth data file 9 and the control data related to the specified vehicle body assembling unit 101 from the seventh data file 10. The read data indicate the characteristics of the specified vehicle body assembling unit 101.

At the point 310 in the program, the main computer 1 specifies one of the vehicle kinds and one of the vehicle types of the specified vehicle kind. At the point 312 in the program, the main computer 1 reads the vehicle body shape CAD data related to the specified vehicle type of the specified vehicle kind from the eighth data file 11. At the step 314 in the program, the main computer 1 reads the normal position data related to the specified vehicle type of the specified vehicle kind from the data file 4. At the point 316 in the program, the read normal position data are converted into corresponding normal positions expressed in a three-dimensional orthagonal coordinate system located on the specified vehicle body assembling unit to calculate normal positions for the respective manipulator arms (robots) since the read normal position data are expressed in a three-dimensional orthagonal coordinate system located on a vehicle body. At the step 318 in the program, the main computer 1 reads the operation pattern data related to the specified vehicle type of the specified vehicle kind from the fifth data file 8 and the vehicle structure data related to the specified vehicle type of the specified vehicle kind from the third data file 6.

At the step 320 in the program, the main computer 1 modifies the normal positions calculated at the point 316 based on the accomplished data included in the vehicle structure data and calculates approach positions based on the modified normal positions. The main computer 1 writes the modified normal positions and the calculated approach positions onto the operation pattern data and adds the operation speeds read from the control data to form a basic operation program for controlling the manipulator arms (robots) used in the specified vehicle body assembling unit 101 for assembling vehicle bodies of the specified vehicle type of the specified vehicle kind, as shown in Table 7. Since the accomplished data, which are obtained during the development of the specified vehicle body assembling unit and during the operation of the specified vehicle body assembling unit, are incorporated into the operation program, it is possible to operate the specified vehicle body assembling unit with a higher vehicle body assembling accuracy.

At the point 322 in the program, a determination is made as to whether or not at least one manipulator arm interferes with one of the other manipulator arms and/or the vehicle body panels. For this determination, simulations are made to detect at least one point occupied by a plurality of objects (manipulator arms and vehicle body panels) while moving the manipulator arms intermittently at uniform intervals of time based on the basic operation program formed at the point 320. The simulations employ three-dimensional models of the respective manipulator arms obtained from the robot shape CAD data related to the specified vehicle body assembling unit and three-dimensional models of the respective vehicle body components obtained from the vehicle body shape CAD data related to the specified vehicle type of the specified vehicle kind. If the answer to this question is "yes", then the program proceeds to the point 324. Otherwise, the program proceeds to the point 326.

At the point 324 in the program, the main computer 1 calculates the path of movement of each of the manipulator arms to avoid the interference. Following this, the program returns to the point 320 where the basic operation program is modified to define the calculated path.

At the point 326 in the program, a determination is made as to whether or not the operation interval between the time at which the manipulator arm operation starts and the time at which the manipulator arm operation is completed is longer than a predetermined tact time. The operation interval is measured during the simulations made at the point 322. If the answer to this question is "yes", then the program proceeds to the point 328. Otherwise, the program proceeds to the point 330.

At the point 328 in the program, a determination is made as to whether or not the manipulator arm related to the operation delay can move at a higher operation speed; that is, the operation speed of the manipulator arm is less than its maximum speed. If the answer to this question is "yes", then the program returns to the point 320 where the basic operation program is modified to change the operation time to a greater value that is less than the maximum speed. Otherwise, the program proceeds to the point 332 where a remainder is provided to the terminal unit 13 that the tact time should be changed, the manipulator arm should be replaced, or another manipulator arm should be added. Following this, the program proceeds to the end point 334.

At the point 330 in the program, the main computer 1 reads the communication codes related to the vehicle body assembling units 101 and 102 from the assembling unit table data and transfers the completed basic operation program to the sub computers 21 and 25. Following this, the program proceeds to the end point 334.

This program is executed repetitively for the other vehicle types of the specified vehicle kind and for all of the vehicle types of the other vehicle kinds to form a basic operation program.

Figure 5:
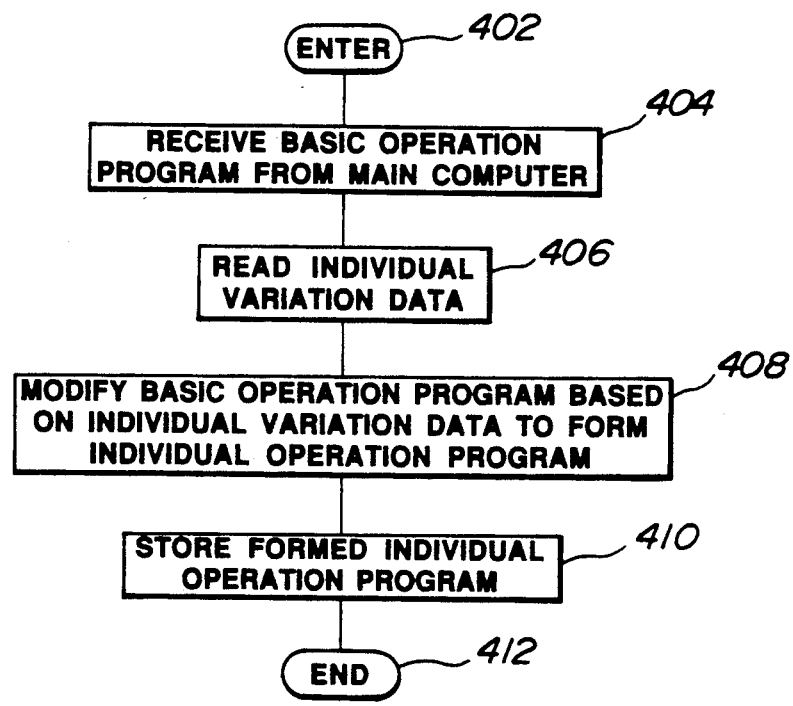
FIG. 5 is a flow diagram illustrating the programming of the sub computer as it is used to form an individual operation program.

FIG. 5 is a flow diagram illustrating the programming of each of the sub computers 21, 25, etc. as it is used to form an individual operation program for operating the corresponding vehicle body assembling unit. It is now assumed that the individual operation program is formed for the vehicle body assembling unit 101. The computer program is entered at the point 402. At the point 404 in the program, the sub computer 21 receives the basic operation program from the main computer 1. At the step 406 in the program, the sub computer 21 reads the individual variation data related to the corresponding vehicle body assembling unit 101 from the data file 24.

At the point 408 in the program, the sub computer 21 modifies the normal positions specified by the basic operation program based on the individual variation data to calculate normal positions for the respective manipulator arms to form an individual operation program for controlling the vehicle body assembling unit 101. Since the individual variation data include position errors related only to the origin and the check points, the sub computer 21 is programmed to interpolate between the data so as to obtain the position errors for the other points. At the point 410 in the program, the formed individual operation program is stored in the individual operation program memory 23. Following this, the program proceeds to the end point 412. The individual operation program is transferred from the program memory 23 to the control unit 111 for controlling the vehicle body assembling unit 101. Similar operations are made to form individual operation programs for the other vehicle body assembling units.

In this embodiment, the sub computers take a part of the operation program formation and reduce the required capacity of the main computer 1.

What is claimed is:

1. A method of forming operation programs used in operating respective automatic machines for a plurality of kinds of work, the automatic machines having the same specifications and individual variations, and each automatic machine including at least one function element for operating on said plurality of kinds of work, the method comprising the steps of:

(a) inputting normal position data and operation pattern data into a main computer, the normal position data specifying a predetermined normal position at which the function elements of the automatic machines are to operate for each of the kinds of work, the operation pattern data specifying a predetermined pattern of operation of the automatic machines for each of the kinds of work;

(b) measuring actual normal positions at which the function elements of respective automatic machines operate actually for each of the kinds of work;

(c) providing individual variation data specifying deviations of the measured actual normal positions from the respective predetermined normal positions for each of the kinds of work;

(d) inputting the individual variation data into the main computer;

(e) selecting one of the automatic machines;

(f) selecting one of the kinds of work;

(g) correcting the predetermined normal position data related to the selected automatic machine and the selected kind of work based on the individual variation data related to the selected automatic machine and the selected kind of work;

(h) inputting accomplished data obtained empirically for each of the kinds of work, the accomplished data specifying correction factors by which the respective predetermined normal positions should be shifted to provide an improved operation accuracy to the automatic machines;

(i) modifying the corrected normal position data based on the accomplished data;

(j) combining the modified normal position data with the operation pattern related to the selected automatic machine and the selected kind of work to form an operation program required for the selected automatic machine to operate for the selected kind of work;

(k) repeating the above sequence of steps to form operation programs required for the selected automatic machine to operate for the other kinds of work;

(l) transferring the formed operation programs from the main computer into one of control units provided for controlling the selected automatic machine; and (m) repeating the above sequence of steps (e) through (l) to form operation programs required for the other automatic machines for all of the kinds of work.

2. The method as claimed in claim 1, further comprising the steps of:

providing second accomplished data obtained empirically for each of the kinds of work, the second accomplished data specifying correction factors by which the respective actual normal positions should be shifted to provide an improved operation accuracy to the automatic machines; and modifying the corrected normal position data based on the accomplished data.

3. The method as claimed in claim 1, further comprising the steps of providing work shape data specifying a shape of each of the kinds of work;

providing machine shape data specifying a shape of the function elements of each of the automatic machines;

determining for each kind of work selected whether the selected automatic machine has at least one function element interfering with other function elements or with the work while simulating the operation of the selected automatic machine according to the corresponding operation program formed for the selected automatic machine based on the work shape data and the machine shape data; and modifying the operation program formed for the selected automatic machine to prevent the function element from interfering with the other function elements or with the work when the selected automatic machine has at least one function element interfering with the other function elements or with the work.

4. The method as claimed in claim 1, further comprising the steps of;

providing control data specifying a normal operation speed and a maximum speed for each function element included in the selected automatic machine;

adding the normal operation speeds of the control data to the operation program formed for the selected automatic machine;

calculating a time interval during which the operation of each of the function elements is completed;

determining whether the calculated time interval is greater than a predetermined value; and modifying the formed operation program to change the corresponding normal operation speed to a greater value that is less than the corresponding maximum speed when the calculated time interval is greater than the predetermined value.

5. A method of forming operation programs used in operating respective automatic machines for a plurality of kinds of work, the automatic machines having the same specifications and individual variations, and each automatic machine including at least one function element for operating on said plurality of kinds of work, the method comprising the steps of:

(a) inputting normal position data and operation pattern data into a main computer, the normal position data specifying a predetermined normal position at which the function elements of the automatic machines are to operate for each of the kinds of work, the operation pattern data specifying a predetermined pattern of operation of the automatic machines for each of the kinds of work;

(b) measuring actual normal positions at which the function elements of respective automatic machines operate actually for each of the kinds of work;

(c) providing individual variation data specifying deviations of the measured actual normal positions from the respective predetermined normal positions for each of the kinds of work;

(d) inputting the provided individual variation data into respective sub computers;

(e) selecting one of the kinds of work;

(f) inputting accomplished data obtained empirically for each of the kinds of work, the accomplished data specifying correction factors by which the respective predetermined normal positions should be shifted to provide an improved operation accuracy to the automatic machines;

(g) modifying the normal position data based upon the accomplished data;

(h) combining the modified normal position data related to the selected kind of work with the operation pattern data related to the selected kind of work to form a basic operation program required for the automatic machines to operate for the selected kind of work;

(i) repeating the sequence of the steps (e) and (h) to form basic operation programs required for the automatic machines to operate for the other kinds of work;

(j) transferring the formed basic operation programs into the sub computers provided for controlling the respective automatic machines; and (k) correcting the basic operation program in each of the sub computers based on the individual variation data related to the corresponding automatic machine.

6. The method as claimed in claim 5, further comprising the steps of:

providing second accomplished data obtained empirically for each of the kinds of work, the second accomplished data specifying correction factors by which the respective actual normal positions should be shifted to provide an improved operation accuracy to the automatic machines; and modifying the corrected normal position data based on the accomplished data.

7. The method as claimed in claim 5, further comprising the steps of providing work shape data specifying a shape of each of the kinds of work;

providing machine shape data specifying a shape of the function elements of each of the automatic machines;

determining for each kind of work selected whether the selected automatic machine has at least one function element interfering with other function elements or with the work while simulating the operation of the selected automatic machine according to the corresponding basic operation program formed for the selected automatic machine based on the work shape data and the machine shape data; and modifying said corresponding basic operation program formed for the selected automatic machine to prevent the function element from interfering with the other function elements or with the work when the selected automatic machine has at least one function element interfering with the other function elements or with the work.

8. The method as claimed in claim 5, further comprising the steps of;

providing control data specifying a normal operation speed and a maximum speed for each function element included in the selected automatic machine;

adding the normal operation speeds of the control data to the operation program formed for the selected automatic machine;

calculating a time interval during which the operation of each of the function elements is completed;

determining whether the calculated time interval is greater than a predetermined value; and modifying the formed operation program to change the corresponding normal operation speed to a greater value that is less than the corresponding maximum speed when the calculated time interval is greater than the predetermined value.

* * * * *